United States Patent
Lin et al.

(10) Patent No.: US 10,714,088 B2
(45) Date of Patent: Jul. 14, 2020

(54) SPEECH RECOGNITION DEVICE AND METHOD OF IDENTIFYING SPEECH

(71) Applicant: HON HAI PRECISION INDUSTRY CO., LTD., New Taipei (TW)

(72) Inventors: Jung-Yi Lin, New Taipei (TW); Chin-Pin Kuo, New Taipei (TW); I-Hua Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 217 days.

(21) Appl. No.: 16/018,174

(22) Filed: Jun. 26, 2018

(65) Prior Publication Data

US 2019/0333516 A1   Oct. 31, 2019

(30) Foreign Application Priority Data

Apr. 26, 2018   (CN) .......................... 2018 1 0387233

(51) Int. Cl.
*G10L 15/24*   (2013.01)
*G10L 15/04*   (2013.01)
*G06K 9/00*    (2006.01)

(52) U.S. Cl.
CPC .......... *G10L 15/24* (2013.01); *G06K 9/00355* (2013.01); *G06K 9/00375* (2013.01); *G10L 15/04* (2013.01)

(58) Field of Classification Search
CPC ....................................................... G10L 15/24
USPC ........................................................ 704/260
See application file for complete search history.

(56) References Cited

U.S. PATENT DOCUMENTS 8,701,392 B2 * 4/2014 Bisaiji ................... F02D 41/10
                                                                60/286
2010/0063820 A1   3/2010 Seshadri

* cited by examiner

*Primary Examiner* — Susan I McFadden
(74) *Attorney, Agent, or Firm* — ScienBiziP, P.C.

(57) ABSTRACT

A speech recognition device includes a speech acquiring unit, a speech outputting unit, a camera unit, and a processor. The processor obtains speech input acquired by the speech acquiring unit, obtains images acquired by the camera unit, chronologically links the obtained speech and the obtained images together, compares the obtained speech to a speech database to confirm matching speech and a confidence level of the matching speech, determines whether the confidence level of the matching speech exceeds a predetermined confidence level, and outputs the matching speech when the confidence level of the matching speech exceeds the predetermined confidence level.

15 Claims, 4 Drawing Sheets

SPEECH RECOGNITION DEVICE AND METHOD OF IDENTIFYING SPEECH

FIELD

The subject matter herein generally relates to speech recognition technology.

BACKGROUND

Generally, speech recognition allows a user to select matching speech according to speech input. However, a user may use hand gestures during normal speech, and the hand gestures may indicate meaning of the user's speech which is not detected by a speech recognition device.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
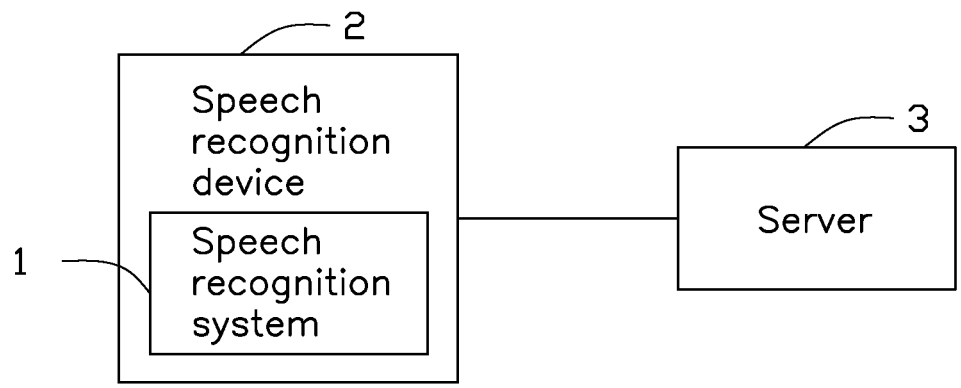
FIG. 1 is a block diagram of a speech recognition system implemented in a speech recognition device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a speech recognition system 1 implemented in a speech recognition device 2. The speech recognition device 2 is in communication with a server 3. In at least one embodiment, the server 3 is a cloud server. The speech recognition system 1 obtains speech input and hand gestures of a user, identifies speech of the user according to the speech input and the hand gestures, and then outputs the speech. In at least one embodiment, the speech recognition device 2 may be a television, a computer, a smart phone, or the like.

Figure 2:
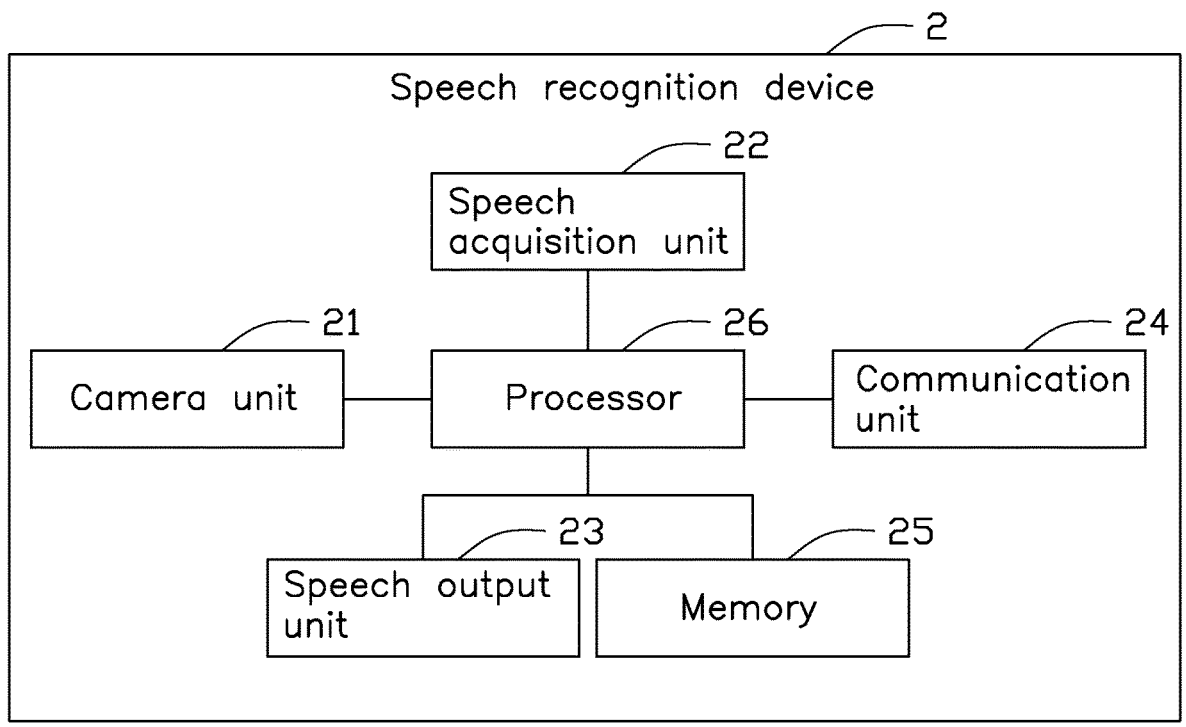
FIG. 2 is a block diagram of the speech recognition device in FIG. 1.

Referring to FIG. 2, the speech recognition device 2 includes, but is not limited to, a camera unit 21, a speech acquiring unit 22, a speech outputting unit 23, a communication unit 24, a memory 25, and a processor 26. In at least one embodiment, the camera unit 21 acquires images in a vicinity of the speech recognition device 2 and sends the acquired images to the processor 26. For example, the camera unit 21 acquires hand gestures of a user and sends the acquired images to the processor 26. In at least one embodiment, the camera unit 21 may be a camera, a 3D camera, or the like. The speech acquiring unit 22 obtains speech input in the vicinity of the speech acquisition device 2 and sends the speech input to the processor 26. In at least one embodiment, the speech acquiring unit 22 may be a microphone or a microphone array.

The speech outputting unit 23 is controlled by the processor 26 to outputs speech. In at least one embodiment, the speech outputting unit 23 may be a loudspeaker. The communication unit 24 establishes communication between the speech recognition device 2 and the server 3. In at least one embodiment, the communication unit 24 may establish communication by WIFI, a 3G/4G network, Zigbee, BLUETOOTH, or the like. The memory 25 stores a plurality of software instruction and a plurality of data. For example, the memory 25 may store a facial image of a user, predefined speech and hand gesture images, and the speech recognition system 1. In at least one embodiment, the memory 25 may be an internal memory of the speech recognition device 2, such as a hard disk or internal storage of the speech recognition device 2. In another embodiment, the memory 25 may be an external storage device of the speech recognition device 2, such as an external hard drive, a smart media card, a secure digital card, a flash card, or the like. The processor 26 obtains the speech input and hand gestures of the user, identifies speech of the user according to the obtained speech input and hand gestures, and outputs the identified speech. In at least one embodiment, the processor 26 may be a central processing unit, a microprocessing unit, or other data processing chip. The processor 26 executes software instructions.

Figure 3:
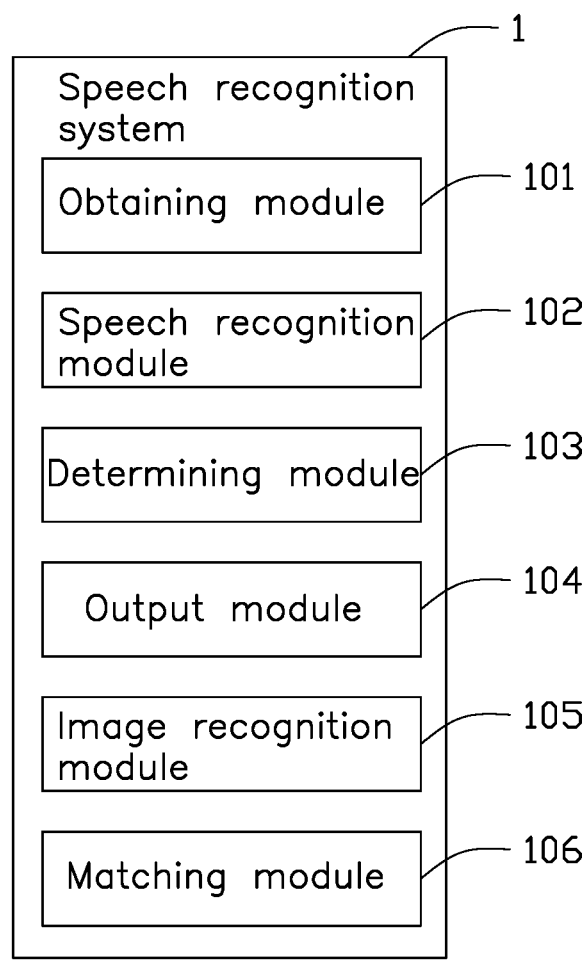
FIG. 3 is a block diagram of the speech recognition system in FIG. 1.

Referring to FIG. 3, the speech recognition system 1 includes a plurality of modules which are stored in the memory 25 and executed by the processor 26. In at least one embodiment, the plurality of modules may include an obtaining module 101, a speech recognition module 102, a determining module 103, an output module 104, an image recognition module 105, and a matching module 106. In another embodiment, the speech recognition system 1 may be embedded as software instructions of the speech recognition device 2.

The obtaining module 101 obtains the speech input acquired by the speech acquiring unit 22.

The obtaining module 101 also obtains the images acquired by the camera unit 21 and chronologically links the obtained images to the obtained speech. In at least one embodiment, the obtaining module 101 divides the obtained speech into a plurality of sentences. In detail, the obtaining module 101 obtains phonological features of the obtained speech, identifies end points of each sentence according to an end-point algorithm, and divides the obtained speech into the plurality of sentences according to the identified end points. The obtaining module 101 further divides the obtained images into a plurality of images and chronologically links the plurality of images to the plurality of sentences.

The speech identifying module 102 compares the obtained speech to a speech database to confirm matching speech and a confidence level of the matching speech. The confidence level represents an accuracy of the matching speech to the speech obtained by the speech acquiring unit 22. In at least one embodiment, the speech identifying module 102 divides the obtained speech into words and phrases, compares the words and phrases to words and phrases of the speech database to confirm matching words and matching phrases, confirms a confidence level of the matching words and a confidence level of the matching phrases, confirms the matching speech according to the matching words and matching phrases, and confirms the confidence level of the matching speech according to the confidence level of the matching words and the confidence level of the matching phrases. In at least one embodiment, the speech identifying module 102 can identify one matching speech or more than one matching speech according to the according to the matching words and matching phrases. In at least one embodiment, the speech database is stored in the memory 25 of the speech recognition device 2. The speech identifying module 102 searches the speech database of the memory 25 to compare the obtained speech to the speech database. In another embodiment, the speech database is stored in the server 3, and the speech identifying module 102 searches the speech database of the server 3 to compare the obtained speech to the speech database.

The determining module 103 determines whether the confidence level of the matching speech exceeds a predetermined confidence level. The predefined confidence level is set according to actual need. For example, the confidence level may be set to 0.6.

The output module 104 outputs the matching speech through the output unit 23 when the confidence level exceeds the predetermined confidence level. In another embodiment, when the speech identifying module 102 confirms more than one matching speech, the output module 104 outputs the matching speech having the highest confidence level.

The image identifying module 105 identifies hand gestures in the obtained images linked to the obtained speech when the confidence level is less than the predetermined confidence level. The matching module 106 matches the identified hand gestures to the matching speech of the images to match the matching speech to a meaning of the hand gestures. The output module 104 outputs the matching speech matched by the matching module 106.

In at least one embodiment, the matching module 106 searches a gesture database according to the identified hand gestures to confirm the meaning of the hand gestures. The matching module 106 matches the matching speech to the meaning of the hand gestures according to the meaning of the hand gestures. In at least one embodiment, when there is more than one matching speech, the matching module 106 confirms a matching degree of the meaning of the hand gestures to each matching speech, confirms the matching speech having a highest matching degree to the meaning of the hand gestures, and matches the matching speech having the highest matching degree to the meaning of the hand gestures. The output module 104 outputs the matching speech matched to the meaning of the hand gestures.

In at least one embodiment, after the obtaining module 101 divides the obtained speech into a plurality of sentences, divides the obtained images into a plurality of images, and chronologically links the plurality of images to the plurality of sentences, the speech identifying module 102 compares each sentence to the speech database to confirm a matching sentence and a confidence level of each matching sentence. The determining module 103 determines whether the confidence level of each matching sentence exceeds the predetermined confidence level. When the confidence level of the matching sentence exceeds the predetermined confidence level, the output module 104 outputs the matching sentence through the output unit 23. When the confidence level of the matching sentence does not exceed the predetermined confidence level, the image identifying module 105 identifies the hand gestures in the images linked to the sentence. The matching module 106 matches the identified hand gestures to the matching sentence of the linked sentence to match the matching speech to the meaning of the hand gestures. The output module 104 outputs the matching speech matched to the meaning of the hand gestures.

Figure 4:
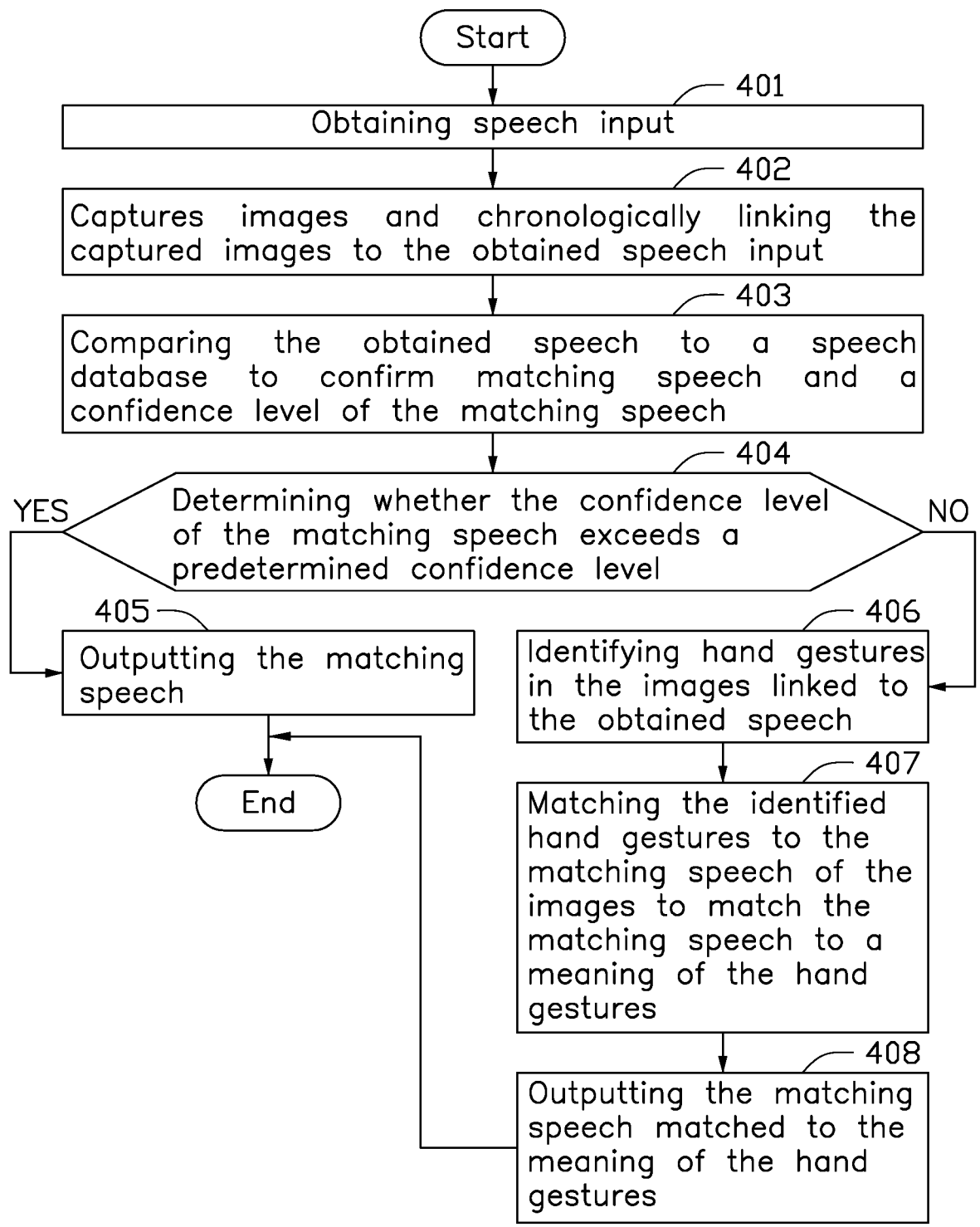
FIG. 4 is flowchart of a method for identifying speech.

FIG. 4 illustrates a flowchart of an exemplary method for identifying speech. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S401.

At block S401, the speech acquiring unit 22 obtains speech input.

At block S402, the camera unit 21 acquires images, and the acquired images are chronologically linked to the obtained speech input. In at least one embodiment, the obtaining module 101 divides the obtained speech into a plurality of sentences. In detail, the obtaining module 101 obtains phonological features of the obtained speech, identifies end points of each sentence according to an end-point algorithm, and divides the obtained speech into the plurality of sentences according to the identified end points. The obtaining module 101 further divides the obtained images into a plurality of images and chronologically links the plurality of images to the plurality of sentences.

At block S403, the obtained speech is compared to a speech database to confirm matching speech and a confidence level of the matching speech. The confidence level represents an accuracy of the matching speech to the speech obtained by the speech acquiring unit 22.

In at least one embodiment, the speech recognition device 2 divides the obtained speech into words and phrases, compares the words and phrases to words and phrases of the speech database to confirm matching words and matching phrases, confirms a confidence level of the matching words and a confidence level of the matching phrases, confirms the matching speech according to the matching words and matching phrases, and confirms the confidence level of the matching speech according to the confidence level of the matching words and the confidence level of the matching phrases. In at least one embodiment, the speech identifying module 102 can identify one matching speech or more than one matching speech according to the according to the matching words and matching phrases. In at least one embodiment, the speech database is stored in the memory 25 of the speech recognition device 2. The speech identifying module 102 searches the speech database of the memory 25 to compare the obtained speech to the speech database. In another embodiment, the speech database is stored in the server 3, and the speech identifying module 102 searches the speech database of the server 3 to compare the obtained speech to the speech database.

In at least one embodiment, after the obtaining module 101 divides the obtained speech into a plurality of sentences, divides the obtained images into a plurality of images, and chronologically links the plurality of images to the plurality of sentences, the speech identifying module 102 compares each sentence to the speech database to confirm a matching sentence and a confidence level of each matching sentence.

At block S404, whether the confidence level of the matching speech exceeds a predetermined confidence level is determined. The predefined confidence level is set according to actual need. For example, the confidence level may be set to 0.6. In at least one embodiment, the speech recognition device 2 determines whether the confidence level of the matching sentence of each sentence exceeds the predetermined confidence level. When the confidence level of the matching sentence exceeds the predetermined confidence level, block S405 is implemented. Otherwise, when the confidence level of the matching sentence does not exceed the predetermined confidence level, block S406 is implemented.

At block S405, the output unit 23 outputs the matching speech. In another embodiment, when more than one matching speech is confirmed, the speech recognition device 2 outputs the matching speech having the highest confidence level.

At block S406, hand gestures in the obtained images linked to the obtained speech are identified. In at least one embodiment, the speech recognition device 2 searches a gesture database according to the identified hand gestures to confirm the meaning of the hand gestures. The gesture database defines meanings of a plurality of hand gestures. The speech recognition device 2 matches the matching speech to the meaning of the hand gestures according to the meaning of the hand gestures. For example, when the confidence level of the matching sentence does not exceed the predetermined confidence level, the speech recognition device 2 identifies the images linked to the sentence and identifies the hand gestures in the images linked to the sentence.

At block S407, the identified hand gestures are matched to the matching speech of the images to match the matching speech to a meaning of the hand gestures.

In at least one embodiment, the speech recognition device 2 matches the matching speech according to the meaning of the hand gestures to match the matching speech to the meaning of the hand gestures. For example, in at least one embodiment, the speech recognition device 2 matches the hand gestures identified in the images and the linked sentences to match the matching speech to the meaning of the hand gestures.

In at least one embodiment, when there is more than one matching speech, the speech recognition device 2 confirms a matching degree of the meaning of the hand gestures to each matching speech, confirms the matching speech having a highest matching degree to the meaning of the hand gestures, and matches the matching speech having the highest matching degree to the meaning of the hand gestures.

At block S408, the matching speech matched to the meaning of the hand gestures is output.

In at least one embodiment, after the obtaining module 101 divides the obtained speech into a plurality of sentences, divides the obtained images into a plurality of images, and chronologically links the plurality of images to the plurality of sentences, the speech identifying module 102 compares each sentence to the speech database to confirm a matching sentence and a confidence level of each matching sentence. The determining module 103 determines whether the confidence level of each matching sentence exceeds the predetermined confidence level. When the confidence level of the matching sentence exceeds the predetermined confidence level, the output module 104 outputs the matching sentence through the output unit 23. When the confidence level of the matching sentence does not exceed the predetermined confidence level, the image identifying module 105 identifies the hand gestures in the images linked to the sentence. The matching module 106 matches the identified hand gestures to the matching sentence of the linked sentence to match the matching speech to the meaning of the hand gestures. The output module 104 outputs the matching speech matched to the meaning of the hand gestures.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A speech recognition device comprising:
    a speech acquiring unit configured to acquire speech input;
    a speech outputting unit;
    a camera unit configured to acquire images; and
    a processor configured to:
        obtain the speech input acquired by the speech acquiring unit;
        obtain the images acquired by the camera unit and chronologically link the obtained speech and the obtained images together;
        compare the obtained speech to a speech database to confirm matching speech and a confidence level of the matching speech, wherein the confidence level of the speech represents an accuracy of the matching speech to the obtained speech;
        determine whether the confidence level of the matching speech exceeds a predetermined confidence level; and
        output the matching speech when the confidence level of the matching speech exceeds the predetermined confidence level.

2. The speech recognition device of claim 1, wherein the processor is further configured to:
    identify the images linked to the obtained speech, when the confidence level does not exceed the predetermined level, and identify hand gestures in the images;

match the identified hand gestures to the matching speech of the images to match the matching speech to a meaning of the hand gestures; and outputting the matching speech matched to the identified hand gestures.

3. The speech recognition device of claim 2, wherein the processor is further configured to search a gesture database according to the identified hand gestures to confirm the meaning of the hand gestures.

4. The speech recognition device of claim 1, wherein the processor is further configured to:

divide the obtained speech into a plurality of sentences;
divide the obtained images into a plurality of images; and
link the plurality of images to the plurality of sentences chronologically;
wherein the processor obtains phonological features from the obtained speech and identifies an end point of each sentence according to an end-point algorithm; and
wherein the processor divides the obtained speech into the plurality of sentences according to the identified end points.

5. The speech recognition device of claim 1, wherein the processor is further configured to:

divide the speech into words and phrases;
compare the words and phrases to words and phrases of the speech database to confirm matching words and phrases of the speech;
confirm a confidence level of the matching words and matching phrases according to the comparison;
confirm the matching speech according to the matching words and matching phrases; and
confirm the confidence level of the matching speech according to the confidence level of the matching words and matching phrases.

6. A method of identifying speech comprising:

obtaining speech input acquired by a speech acquiring unit of a speech acquisition device;
obtaining images acquired by a camera unit of the speech acquisition device and chronologically linking the obtained speech and the obtained images together;
comparing the obtained speech to a speech database to confirm matching speech and a confidence level of the matching speech, wherein the confidence level of the speech represents an accuracy of the matching speech to the obtained speech;
determining whether the confidence level of the matching speech exceeds a predetermined confidence level; and
outputting the matching speech when the confidence level of the matching speech exceeds the predetermined confidence level.

7. The method of claim 6, further comprising:

identifying the images linked to the obtained speech, when the confidence level does not exceed the predetermined level, and identifying hand gestures in the images;
matching the identified hand gestures to the matching speech of the images to match the matching speech to a meaning of the hand gestures; and
outputting the matching speech matched to the identified hand gestures.

8. The method of claim 7, further comprising searching a gesture database according to the identified hand gestures to confirm the meaning of the hand gestures.

9. The method of claim 6, further comprising:

dividing the obtained speech into a plurality of sentences;
dividing the obtained images into a plurality of images; and
linking the plurality of images to the plurality of sentences chronologically;
wherein the processor obtains phonological features from the obtained speech and identifies an end point of each sentence according to an end-point algorithm; and
wherein the processor divides the obtained speech into the plurality of sentences according to the identified end points.

10. The method of claim 6, further comprising:

dividing the speech into words and phrases;
comparing the words and phrases to words and phrases of the speech database to confirm matching words and phrases of the speech;
confirming a confidence level of the matching words and matching phrases according to the comparison;
confirming the matching speech according to the matching words and matching phrases; and
confirming the confidence level of the matching speech according to the confidence level of the matching words and matching phrases.

11. A non-transitory storage medium having stored thereon instructions that, when executed by at least one processor of a speech recognition device, causes the least one processor to execute instructions of a method for identifying speech, the method comprising:

obtaining speech input acquired by a speech acquiring unit of a speech acquisition device;
obtaining images acquired by a camera unit of the speech acquisition device and linking the obtained speech and the obtained images together chronologically;
comparing the obtained speech to a speech database to confirm matching speech and a confidence level of the matching speech, wherein the confidence level of the speech represents an accuracy of the matching speech to the obtained speech;
determining whether the confidence level of the matching speech exceeds a predetermined confidence level; and
outputting the matching speech when the confidence level of the matching speech exceeds the predetermined confidence level.

12. The non-transitory storage medium of claim 11, further comprising:

identifying the images linked to the obtained speech, when the confidence level does not exceed the predetermined level, and identifying hand gestures in the images;
matching the identified hand gestures to the matching speech of the images to match the matching speech to a meaning of the hand gestures; and
outputting the matching speech matched to the identified hand gestures.

13. The non-transitory storage medium of claim 12, further comprising searching a gesture database according to the identified hand gestures to confirm the meaning of the hand gestures.

14. The non-transitory storage medium of claim 11, further comprising:

dividing the obtained speech into a plurality of sentences;
dividing the obtained images into a plurality of images; and
linking the plurality of images to the plurality of sentences chronologically;
wherein the processor obtains phonological features from the obtained speech and identifies an end point of each sentence according to an end-point algorithm; and wherein the processor divides the obtained speech into the plurality of sentences according to the identified end points.

15. The non-transitory storage medium of claim 11, further comprising:
dividing the speech into words and phrases;
comparing the words and phrases to words and phrases of the speech database to confirm matching words and phrases of the speech;
confirming a confidence level of the matching words and matching phrases according to the comparison;
confirming the matching speech according to the matching words and matching phrases; and
confirming the confidence level of the matching speech according to the confidence level of the matching words and matching phrases.

\* \* \* \* \*